United States Patent [19]

Begala, Jr. et al.

[11] 4,191,645

[45] Mar. 4, 1980

[54] PROCESS FOR DEWATERING SEWAGE SLUDGE

[75] Inventors: Arthur J. Begala, Jr., Fairfield; Ernest D. Kaufman, Stamford, both of Conn.

[73] Assignee: American Cyanamid Company, Stamford, Conn.

[21] Appl. No.: 860,809

[22] Filed: Dec. 15, 1977

[51] Int. Cl.$^2$ ............................ C02B 1/20; C02C 3/00
[52] U.S. Cl. ........................................ 210/47; 210/54
[58] Field of Search ............. 210/10, 42 R, 47, 51–54; 260/29.6 WQ, 29.6 HN, 29.6 SQ

[56] References Cited

U.S. PATENT DOCUMENTS

| | | | |
|---|---|---|---|
| 3,414,514 | 12/1968 | Buhl | 210/54 |
| 3,734,873 | 5/1973 | Anderson et al. | 260/29.6 SQ |
| 3,920,599 | 11/1975 | Hurlock et al. | 260/29.6 HN |
| 3,975,341 | 8/1976 | Trapasso | 260/29.6 WQ |
| 4,077,930 | 3/1978 | Lim et al. | 210/54 |

OTHER PUBLICATIONS

Alfrey et al., *Copolymerization*, Interscience Publishers, New York, vol. VIII, 1952, p. 156.
Fram et al., "Emulsion Poly. by Continuous Feed of Reactants," *Ind. and Eng. Chem.*, vol. 47, No. 5, May 1955, pp. 1000–1005.

*Primary Examiner*—Charles N. Hart
*Assistant Examiner*—Peter A. Hruskoci
*Attorney, Agent, or Firm*—William J. van Loo

[57] ABSTRACT

Use of a cationic copolymer prepared by incremental addition of a cationic monomer during the polymerization reaction of a nonionic monomer in the dewatering of sewage sludges provides improved performance characteristics.

5 Claims, No Drawings

PROCESS FOR DEWATERING SEWAGE SLUDGE

CROSS-REFERENCE TO RELATED APPLICATIONS

This invention is related to application Ser. No. 860,816 and Ser. No. 860,815, filed on Dec. 15, 1977. This application relates to a process of use of the cationic copolymer in the dewatering of sewage sludges. Ser. No. 860,816, relates to the process of preparation of a cationic copolymer and product thereby. Ser. No. 860,815 relates to use of the polymer as a drainage aid for paper.

This invention relates to an improved process for dewatering sewage sludges. More particularly, this invention relates to such a process wherein there is used as dewatering aid a cationic copolymer of improved performance characteristics.

Water-soluble copolymers derived from water-soluble comonomers are conveniently prepared in aqueous solution. When many of these water-soluble polymers are prepared at high molecular weight in aqueous solution, a firm gel results even at low concentration. This gel is difficult to process and does not readily provide a dilute polymer solution for use in its various applicatons. The polymer gel can be dried to remove aqueous medium and provide a polymer in dry powder form. However, redissolution of this dried polymer to form a dilute solution is extremely tedious, requires extensive time periods, and results in lumps of undissolved polymer surrounded by gelatinous polymer, the lumps being commonly called "fish-eyes". The lumps reduce the effective content of polymer in the dilute solution and, accordingly, reduce the efficiency of the dilute solution in various uses to which it is put. These deficiencies associated with such polymer products obtained by polymerization in aqueous solution have led to alternative procedures to avoid such deficiencies.

One successful alternative procedure for preparing such polymers is to dissolve the monomer content in water, emulsify the monomer solution in a hydrocarbon oil to provide a water-in-oil emulsion, and effect monomer polymerization in the dispersed phase of the water-in-oil emulsion to obtain the desired degree of polymerization. The product thus obtained is then inverted in added water to an oil-in-water emulsion which releases the polymer to the continuous aqueous phase wherein it readily dissolves for use in various applications. This procedure has been extensively employed to avoid the deficiencies of gel-type polymers obtained by polymerization in aqueous solution while providing desirable performance in many uses.

The water-in-oil emulsion procedure described above requires that the entire monomer charge be dissolved in water in preparing the water-in-oil emulsion which is to serve as the medium in which polymerization is conducted. This requirement limits the content of polymer in the water-in-oil emulsion that can be effectively employed without loss of performance characteristics of the resulting polymer. The requirement also limits the performance characteristics of the resulting polymer regardless of the polymer content of the water-in-oil emulsion.

A particular application in which water-soluble polymers are effective is that of dewatering of sewage sludges. The most efficient polymers are copolymers consisting of a major amount of a nonionic monomer and a minor amount of a cationic comonomer. These copolymers when prepared in aqueous solution provide gel-type polymers with their attendant deficiencies. Accordingly, these cationic copolymers are conventionally prepared for use in sludge dewatering as water-in-oil emulsions in which the cationic copolymer is percent in the dispersed aqueous phase. While these conventional water-in-oil copolymer emulsions provide desirable performance characteristics in sludge dewatering, there exists a constant need for improved cationic copolymers for this application that exhibit improved performance characteristics and result in an improved process for sludge dewatering. The provision for such an improved process would fulfill a long-felt need and constitute a notable advance in the art.

In accordance with the present invention, there is provided an improvement in a process for dewatering sewage sludges wherein an effective amount of an inverted water-in-oil emulsion of a cationic copolymer is admixed therewith and water is removed from the thus-treated sludge, the improvement comprising using as the water-in-oil emulsion one which contains a cationic copolymer of a major amount of a nonionic monomer and a minor amount of a cationic comonomer of greater reactivity than said nonionic monomer and is prepared by a process which comprises (1) preparing an aqueous solution of the total quantity of said nonionic monomer to be employed and up to about 95 mol percent of the total quantity of said cationic copolymer to be employed, thus providing a withheld portion of said cationic comonomer; (2) emulsifying said aqueous solution in a sufficient quantity of a hydrocarbon oil to provide a water-in-oil emulsion in which water comprises the dispersed phase; (3) initiating the polymerization reaction in said dispersed phase; and (4) continuing the polymerization in said dispersed phase while incrementally adding thereto said withheld portion of said cationic comonomer until substantially all of the nonionic monomer and cationic comonomer have reacted.

Unexpectedly, the process of the present invention provides the following advantages over the conventional process:

1. Faster filtration rates at the same polymer dosage;
2. Equal filtration rates at significantly lower polymer dosage.

Cationic copolymers used in the process of the present invention differ from the corresponding conventional copolymers in the performance characteristics they exhibit in sludge dewatering. Although such differences exist, it is not possible to characterize the copolymer by structural distinctions over prior art polymers because no method of establishing such distinctions is currently known. However, since the performance distinctions arise as a result of the process by which the polymers used in the process of the present invention are prepared, the polymers will be characterized by such preparation method.

The cationic copolymers useful in the process of the present invention are comprised of a major proportion of repeating units derived from a nonionic monomer and a minor proportion of repeating units derived from a cationic copolymer which is more reactive in the polymerization reaction than the nonionic monomer. The nonionic monomer and cationic copolymer are water-soluble and the polymer which results is also water-soluble. Suitable nonionic monomers include for example acrylamide, methacrylamide, N-methyl acrylamide, N-methylmethacrylamide, and the like. Suitable cationic comonomers include for example 1-trimethylammonium-2-hydroxypropylmethacrylate methosulfate, trimethylammoniumethylmethacrylate methosulfate, 1-trimethylammonium-2-hydroxypropylacrylate methosulfate, 3-methacrylamidopropyltrimethylammonium chloride and the like. The repeating monomer units of the polymer will comprise at least about 50 mol percent of nonionic monomer units, preferably at least about 70 mol percent thereof, and at least about 1 mol percent of cationic comonomer units, preferably about 5 to 10 mol percent thereof. Other water-soluble comonomer units may also be present provided they do not interfere with the performance characteristics of the cationic copolymers used in the process of the present invention. If anionic comonomers are present, the mol proportion thereof should be less than that of the cationic comonomer so that the resulting copolymer is cationic in nature. In order to prepare the cationic copolymer by the process of the present invention, one must initially decide what composition is desired in the final cationic copolymer to be prepared.

In preparing a cationic copolymer in accordance with the process of the present invention, an emulsion of two phases is involved. The continuous phase is an oil phase. The oil phase will comprise a hydrocarbon oil such as a paraffin oil, benzene, toluene, fuel oil, kerosene and the like. In the oil phase will be contained a suitable emulsifier such as sorbitan mono-oleate in sufficient quantity. The oil phase may comprise from about 25 to about 75 weight percent of the total emulsion composition, but to achieve a high polymer content in the emulsion, the oil phase will generally comprise from about 25 to 50 weight percent of the emulsion composition. The dispersed phase is an aqueous phase. The nonionic monomer and cationic comonomer are dissolved in, or will dissolve in, this phase along with polymerization initiators and regulators as the polymerization reaction is conducted. The dispersed phase may comprise from about 75 to about 25 weight percent of the total emulsion composition, but to achieve a high polymer content in the emulsion, the dispersed aqueous phase will generally comprise from about 50 to 75 weight percent of the emulsion composition.

In carrying out the preparation of the instant polymer after having determined the composition of the cationic copolymer to be prepared, it is next necessary to determine the amount of cationic comonomer that is to be withheld from the initial monomer solution. At least some of the cationic comonomer is to be withheld and generally the amount withheld will vary from about 25 to 95 mole percent of the total amount of cationic comonomer to make up the composition of the cationic copolymer. Particularly good results are obtained when from about 25 to 75 mol percent of cationic comonomer is withheld and, accordingly, this constitutes a preferred range.

An aqueous solution is prepared containing all of the nonionic monomer and that quantity of cationic comonomer that is not to be withheld. The total amount of water employed should be sufficient to dissolve the total monomer content. The quantity of total monomer content will generally be such as to provide a polymer content in the final product of up to about 60 weight percent, preferably about 25 to 50 weight percent. The actual amounts used may vary widely depending upon many variables, such as the monomers employed, the nature of the copolymer produced, the final molecular weight desired, and the like.

After a suitable monomer solution is obtained, it is next emulsified in the hydrocarbon oil phase using appropriate processing. The relative amounts of dispersed and continuous phases will be as previously stated, with appropriate emulsifier as described. The emulsion obtained should be of sufficient stability to permit such handling as is necessary prior to the eventual inversion of the emulsion. The aqueous monomer solution may contain such conventional additives as are desired. For example, the solution may contain chelating agents to remove polymerization inhibitors, chain transfer agents, pH adjustors, and initiators or oxidizing components of a redox system.

After the emulsion is obtained as described, the polymerization reaction is initiated according to conventional procedures. The reactor used to conduct the polymerization is generally purged with appropriate gas to remove oxygen. The reaction medium may be heated or the reducing component of the redox system may be incrementally added and the temperature of polymerization controlled by the exotherm generated. A preferred procedure is to add the oxidizing component of the redox system to the monomer solution and initiate polymerization by adding increments of the reducing component of the redox system and controlling the temperature by the rate of addition of the reducing component.

After the polymerization is initiated, the polymerization is completed by adding increments of the withheld cationic comonomer and the reducing component of the redox system. The reaction is complete when the nonionic monomer has substantially been depleted and all of the withheld cationic comonomer has been added. The time required to complete the polymerization reaction will vary depending upon many factors such as the nature of the monomers employed, the temperature at which the reaction is conducted, the molecular weight of the cationic copolymer to be obtained and the like. Generally the polymerization reaction will follow conventional procedures except for the provisions for withheld cationic monomer and incremental addition thereof during the course of polymerization. When the content of nonionic monomer in the reaction medium is below about 5.0 weight percent, reaction is considered to be substantially complete.

After the polymerization reaction is complete, handling of the reaction product will follow conventional procedures. The water-in-oil emulsion of cationic copolymer thus obtained may be adjusted in pH, dilute, or otherwise modified following conventional procedures. A preferred option is to add an inverting surface active agent so that upon subsequent dilution with water an oil-in-water emulsion is readily formed and the polymer is released to the continuous aqueous phase wherein it readily dissolves.

The water-in-oil cationic copolymer is used in the sewage sludge in amounts effective in dewatering said sludge. Typically effective amounts may range from about 0.01 to 100 milligrams of cationic copolymer per gram of dry solids, preferably about 0.1 to 10 milligrams per gram of dry solids.

The invention is more fully illustrated in the examples which follow wherein all parts and percentages are by weight unless otherwise specified.

COMPARATIVE EXAMPLE A

This example illustrates the conventional process for preparing a water-in-oil emulsion of a cationic copolymer of a nonionic monomer and a cationic comonomer.

The cationic copolymer was prepared by copolymerizing 95 mol percent of acrylamide and 5 mol percent of trimethylammoniumethylmethacrylate methosulfate (TMAEM.MS) following the procedure described below.

| Oil Phase | | |
|---|---|---|
| Paraffin oil | 208 | Grams |
| Sorbitan mono-oleate | 21 | Gms. |
| Aqueous Phase | | |
| Acrylamide | 248 | Gms. |
| TMAEM . MS | 52.03 | Gms. |
| Ethylenediaminetetraacetic acid, disodium salt | .25 | Gm. |
| Isopropanol | 1.5 | Gms |
| Sodium bromate | .025 | Gm. |
| Deionized water to total | 590.4 | Gms. |

The pH of the aqueous phase was adjusted to 3.5 with sulfuric acid.

The aqueous phase was emulsified in the oil phase providing a water-in-oil emulsion. This was transferred to a 1-liter flask for polymerization. The flank and contents were purged with nitrogen gas for about 1 hour to remove oxygen. The polymerization was then initiated by adding 0.01 gm. sodium metabisulfite to the emulsion which was at 27° C. The reaction was conducted for a period of about 5¾ hours during which 4 additions of sodium metabisulfite, each of 0.01 gm. were made, the last at about 4 hours from initiation. The reaction was conducted at a temperature which rose to about 40° C. in about 25 minutes and then remained between about 35° and 40° C. throughout the reaction. Reaction was continued further for an additional 2¼ hours. Analysis of the product after completion of the reaction indicated a free acrylamide monomer content of 0.18 weight percent. Polymer solids of the emulsion were 35.98% as obtained.

To provide a water-in-oil emulsion that was self-inverting when added to dilution water, the following procedure was followed. To 722.5 grams of emulsion was added 4.82 grams of sodium metabisulfite and 19.7 grams of inverting surfactant, the reaction product of a mixed $C_{12}$–$C_{14}$ alcohol with 60% ethylene oxide. The final product had a polymer solids of 34.28% and a standard viscosity of 3.28 centipoises. The standard viscosity is determined on a 0.1% solution of copolymer in aqueous 1 molar NaCl at 25° C. using a Brookfield viscometer equipped with an ultra-low viscosity adapter.

EXAMPLE 1

The procedure of Comparative Example 1 was repeated in all essential details except as noted.

The initial charge of monomers was 95 mole percent acrylamide and 2 mole percent trimethylammoniumethylmethacrylate methosulfate. The withheld 3 mole percent of monomer was added over a 2¾ hour period starting about 25 minutes after initiation of the polymerization reaction.

After completion of the polymerization the residual free acrylamide monomer content was 0.34% and the polymer solids of the emulsion was 36.66%.

The emulsion was converted to a self-inverting emulsion as in Comparative Example A. The final polymer solids were 34.69% and the standard viscosity was 3.05 cps.

EXAMPLE 2

In order to determine the performance characteristics of the cationic copolymers prepared in each of Comparative Example A and Example 1, the emulsions were added in separate runs at various polymer dosage levels to sewage sludge treated at Greenwich, Connecticut, and the filtrate rate of the thus-modified sludge was then determined. The various data obtained was then plotted and the necessary polymer dosage to provide a filtration rate of 80 ml./min. was determined from the plot. A polymer dosage of 1.56 milligrams per gram of dry sludge solids was required using the cationic copolymer of Comparative Example A. A polymer dosage of 1.0 milligrams per gram of dry sludge solids was required using the cationic copolymer of Example 1. The cationic copolymer of Example 1 thus provides the same filtration rate as that of the copolymer of Comparative Example A at 36.0% lower polymer dosage.

COMPARATIVE EXAMPLE B

The procedure of Comparative Example A was repeated in every material detail to confirm the results obtained in Example 2. The final self-inverting emulsion had a polymer solids of 34.46%, a standard viscosity of 3.02 cps., and a residual free acrylamide monomer content of 0.08%.

EXAMPLE 3

The procedure of Example 1 was repeated in every material detail to conform the results obtained in Example 2. The final self-inverting emulsion had a polymer solids of 35.45%, a standard viscosity of 3.34 cps., and a residual free acrylamide monomer content of 0.12%.

EXAMPLE 4

The procedure of Example 2 was followed in every material detail except that the cationic copolymers of Comparative Example B and Example 3 were evaluated. The polymer of Comparative Example B required a polymer dosage of 3.12 milligrams per gram of dry sludge solids for a filtration rate of 80 ml./min. and the polymer of Example 3 required a polymer dosage of 1.88 milligrams per gram of dry sludge solids for the same filtration rate. The cationic copolymer of Example 3 thus provides the same filtration rate as that of the copolymer of Comparative Example B at 40% lower polymer dosage.

COMPARATIVE EXAMPLE C

The procedure of Comparative Example A was repeated in every material detail except that the amount of aqueous phase and monomer content were reduced to provide a polymer content in the final emulsion of 29%. The final self-inverting emulsion had a solids content of 29%, a standard viscosity of 3.52 cps., and a residual free acrylamide content of 0.028.

EXAMPLE 4

The procedure of Example 1 was repeated in every material detail except that the amount of aqueous phase and monomer content were reduced to provide a polymer content of 29% in the final emulsion. The final self-inverting emulsion had a polymer content of 29%, a standard viscosity of 3.69 cps., and a residual free acrylamide monomer content of 0.20%.

EXAMPLE 5

The procedure of Example 2 was again followed in every material detail except that the cationic copolymers of Comparative Example C and Example 4 were evaluated. The polymer of Comparative Example C required a polymer dosage of 2.56 milligrams per gram of dry sludge solids for a filtration rate of 80 ml./min. The polymer of Example 4 required a polymer dosage of 1.6 milligrams per gram of dry sludge solids for a filtration rate of 80 ml./min. The cationic polymer of Example 4 thus provides the same filtration as that of Comparative Example C at 37.5% lower polymer dosage.

EXAMPLE 6

A series of preparations of a 90/10 mole ratio of acrylamide/trimethyl aminoethylmethacrylate methosulfate polymer was run. In a comparative run, all of the monomer content was added to the monomer solution and the procedure of Comparative Example A was followed. In a first run A, 60% of the quaternary monomer was withheld from the monomer solution and the procedure of Example 1 was followed. In a second run B, 90% of the quaternary monomer was withheld and the procedure of Example 1 was followed. Results were as follows:

| Run | Standard Viscosity (cps) | Dosage For 100 ml/min Filtration Rate (mg/g) |
|---|---|---|
| Comparative | 3.22 | 2.40 |
| A | 3.29 | 1.36 |
| B | 2.98 | 1.48 |

EXAMPLE 7

The procedure of Example 6 was followed using a 90/10 mole ratio of acrylamide/trimethylaminoethylmethacrylate chloride. The comparative run contained all monomer content in the monomer solution. In Run A, 60% of the quaternary monomer was withheld and in Run B, 90% of the quaternary monomer was withheld. Results were as follows:

| Run | Standard Viscosity (cps) | Dosage For 100 ml/min Filtration Rate (mg/g) |
|---|---|---|
| Comparative | 3.58 | 1.18 |
| A | 3.51 | 0.98 |
| B | 3.32 | 0.84 |

COMPARATIVE EXAMPLE D

The general procedure of Comparative Example A was followed in every material detail with the following exceptions: azobis(valeronitrile) was used as catalyst in place of the sodium bromate:sodium methabisulfite used in Comparative Example A in the amount of 0.01% based on the weight of monomer; the reaction was carried out at 55°-60° C. for 3 hours; the emulsion contained 29% polymer; and the standard viscosity was 3.4 centipoises. Dosage requirements in sewage sludge obtained from New Caanan, Connecticut sewage system was 1.72 milligram per gram of dry sludge for 80 ml/min. filtrate.

EXAMPLE 8

The procedure of Comparative Example D was followed in every material detail except that 61% of the trimethylaminoethyl methacrylate methosulfate monomer charge was withheld and subsequently added during the course of polymerization in uniform increments. The resulting emulsion contained 29% polymer and had a standard viscosity of 3.5. Dosage requirements in sewage sludge obtained from New Caanan, Connecticut sewage system was 1.10 milligrams per gram of dry sludge for a filtrate of 80 ml./min. This represents a 36% reduction in dosage relative to the product of Comparative Example D.

We claim:

1. In a process for dewatering sewage sludges wherein an effective amount of an inverted water-in-oil emulsion of a cationic copolymer is admixed therewith and water is removed from the thus-treated sludge, the improvement which comprises using as the water-in-oil emulsion one which contains a cationic copolymer of a major portion of a nonionic monomer and a minor amount of a cationic comonomer of greater reactivity than said nonionic monomer and is prepared by a process which comprises (1) preparing an aqueous solution of the total quantity of said nonionic monomer to be employed and up to about 95 mol percent of the total quantity of said cationic comonomer to be employed, thus providing a withheld portion of said cationic comonomer; (2) emulsifying said aqueous solution in a sufficient quantity of a hydrocarbon oil to provide a water-in-oil emulsion in which water comprises the dispersed phase; (3) initiating the polymerization reaction in said dispersed phase; and (4) continuing the polymerization reaction in said dispersed phase while incrementally adding thereto said withheld portion of said cationic comonomer until substantially all of the nonionic monomer and cationic comonomer have reacted.

2. The process of claim 1 wherein the cationic copolymer comprises at least about 70 mol percent of nonionic monomer.

3. The process of claim 1 wherein the cationic copolymer comprises acrylamide as the nonionic monomer and trimethylammoniumethylmethacrylate methosulfate as the cationic comonomer.

4. The process of claim 3 wherein the total mol percent of nonionic monomer to cationic monomer is 90–95:10–5.

5. The process of claim 1 wherein the amount of water-in-oil emulsion employed is sufficient to provide from about 0.1 to about 10 milligrams of cationic copolymer per gram of dry sludge solids.

* * * * *